(12) United States Patent
Wang et al.

(10) Patent No.: US 10,933,884 B2
(45) Date of Patent: Mar. 2, 2021

(54) SYSTEMS AND METHODS FOR CONTROLLING AUTONOMOUS VEHICLE IN REAL TIME

(71) Applicant: BEIJING DIDI INFINITY TECHNOLOGY AND DEVELOPMENT CO., LTD., Beijing (CN)

(72) Inventors: Fenglei Wang, Beijing (CN); Jintao Wang, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 16/903,401

(22) Filed: Jun. 17, 2020

(65) Prior Publication Data

US 2020/0391756 A1  Dec. 17, 2020

Related U.S. Application Data

(63) Continuation of application No. PCT/CN2019/091506, filed on Jun. 17, 2019.

(51) Int. Cl.
*B60W 50/029*  (2012.01)
*B60W 10/20*  (2006.01)
(Continued)

(52) U.S. Cl.
CPC .......... *B60W 50/029* (2013.01); *B60W 10/04* (2013.01); *B60W 10/20* (2013.01);
(Continued)

(58) Field of Classification Search
CPC .......... B60W 50/029; B60W 60/0018; B60W 10/04; B60W 10/20; B60W 50/045;
(Continued)

(56) References Cited

U.S. PATENT DOCUMENTS

| 2006/0101465 | A1 | 5/2006 | Kato et al. |
| 2017/0185082 | A1 | 6/2017 | Matos |
| 2019/0277206 | A1* | 9/2019 | McCarthy, Jr. .......... F02D 29/02 |

FOREIGN PATENT DOCUMENTS

| CN | 201000576 Y | 1/2008 |
| CN | 105522935 A | 4/2016 |
| CN | 106773711 A | 5/2017 |

OTHER PUBLICATIONS

International Search Report in PCT/CN2019/091506 dated Mar. 18, 2020, 4 pages.
(Continued)

*Primary Examiner* — Gertrude Arthur Jeanglaude
(74) *Attorney, Agent, or Firm* — Metis IP LLC

(57) ABSTRACT

Systems and methods for operating a vehicle automatically in real time may be provided. The system may receive and process real time sensor data from a sensing system via an arithmetic and control unit (ACU). The system may obtain, via the ACU, one or more tasks during the processing of the real time sensor data. The system may classify, via the ACU, the one or more tasks into real time vehicle controlling (VC) tasks and non real time VC tasks. The system may further send the real time VC tasks to at least one dedicated processing core of the ACU for processing the real time VC tasks and generating one or more real time VC commands accordingly.

20 Claims, 8 Drawing Sheets

(51) Int. Cl.
*B60W 10/04* (2006.01)
*B60W 50/14* (2020.01)
*B60W 50/04* (2006.01)
*B60W 60/00* (2020.01)

(52) U.S. Cl.
CPC .......... *B60W 50/045* (2013.01); *B60W 50/14* (2013.01); *B60W 60/0018* (2020.02); *B60W 2050/0292* (2013.01); *B60W 2050/046* (2013.01); *B60W 2420/42* (2013.01); *B60W 2420/52* (2013.01)

(58) Field of Classification Search
CPC ......... B60W 50/14; B60W 2050/0292; B60W 2050/046; B60W 2420/42; B60W 2420/52
USPC .......................................................... 701/23
See application file for complete search history.

(56) References Cited

OTHER PUBLICATIONS

Written Opinion in PCT/CN2019/091506 dated Mar. 18, 2020, 5 pages.

\* cited by examiner

SYSTEMS AND METHODS FOR CONTROLLING AUTONOMOUS VEHICLE IN REAL TIME

CROSS-REFERENCE TO RELATED APPLICATIONS

This application is a continuation of International Application NO. PCT/CN2019/091506, filed on Jun. 17, 2019, the entire contents of which are hereby incorporated by reference.

TECHNICAL FIELD

This disclosure generally relates to signal communication, and more particularly, to systems and methods for controlling an autonomous vehicle according to real time commands.

BACKGROUND

With the development of cutting-edge technologies such as artificial intelligence (AI), autonomous vehicle has great prospects for multiple applications, for example, in transportation service. For autonomous vehicle system, real time signals transmission may need to be guaranteed. In some cases, if one or more real time vehicle control commands (e.g., braking, switching lanes) are not sent to vehicle controlling components (e.g., actuators) in time, it may cause vehicle accident or other problems. Therefore, it is desirable to develop systems and methods for controlling autonomous vehicle according to real time vehicle control commands more consistently.

SUMMARY

According to one aspect of the present disclosure, a system is provided. The system may include at least one storage device, an arithmetic and control unit (ACU), a real-time transmission unit, and a vehicle controlling unit (VCU). The at least one storage device may include at least one set of instructions. The ACU, the real-time transmission unit, and the VCU may be in communication with the at least one storage device to execute the at least one set of instructions. The ACU may include a multiple core processor having at least one processing core dedicated for processing one or more real-time vehicle controlling (VC) tasks, and the ACU may be configured to receive and process real time sensor data from a sensing system to generate one or more real time VC commands. The real-time transmission unit may be configured for transmitting the one or more real time VC commands to the VCU in real time. The VCU may be configured for receiving and executing the one or more real time VC commands generated by the ACU to operate the vehicle in real time accordingly.

In some embodiments, the real time sensor data may include signals from at least one of a LiDAR, a radar, a camera, and a positioning system.

In some embodiments, the ACU may be further configured to obtain and classify one or more tasks into the one or more real time VC tasks and tasks that are not real time VC tasks (non real time VC tasks).

In some embodiments, the ACU may be operated by a real time Linux system including at least one kernel for assigning the real time VC task to the at least one dedicated processing core to generate the real time VC command.

In some embodiments, the real-time transmission unit may be configured to be operated independently from the ACU.

In some embodiments, the real-time transmission unit may be configured to control the vehicle when the ACU is disabled or irresponsive.

In some embodiments, the real time VC command may include at least one of acceleration, deceleration, making a turn, and switching lanes.

In some embodiments, the real time sensor data may be updated continuously by the system and the ACU may generate updated real time VC commands based on the updated real time sensor data, which is in turn transmitted to the VCU via the real-time transmission unit, and there may be a time interval between the transmission of a real time VC command and its immediate updated real time VC command that is measured against an interval threshold. The system may further comprise a time limit with a set of accompany instructions stored in the storage device to instruct the system to determine whether the time interval is within the interval threshold. If the time interval is shorter than or equal to the interval threshold, the ACU may send, via the real-time transmission unit, the updated real time VC commands to VCU to control the vehicle accordingly. If the time interval is longer than the interval threshold, the ACU may determine whether the difference between the time interval and the interval threshold is within a time limit. If the difference is longer than the time limit, the real-time transmission unit may generate a real time VC command to directly command VCU to slow down the vehicle. Alternatively, the real-time transmission unit may repeat or maintain the real time VC command.

In some embodiments, the set of accompany instructions may further instruct the system to alert a user of the vehicle.

According to an aspect of the present disclosure, a method is provided. The method may include one or more of the following operations. At least one processor may receive and process, via an arithmetic and control unit (ACU), real time sensor data from a sensing system. The at least one processor may obtain, via the ACU, one or more tasks during the processing of the real time sensor data. The at least one processor may classify, via the ACU, the one or more tasks into real time vehicle controlling (VC) tasks and non real time VC tasks. The at least one processor may send the real time VC tasks to at least one dedicated processing core of the ACU for processing the real time VC tasks and generating one or more real time VC commands accordingly.

According to another aspect of the present disclosure, a non-transitory computer readable medium is provided. The non-transitory computer readable medium may comprise executable instructions that cause at least one processor to effectuate a method. The method may include one or more of the following operations. At least one processor may receive and process, via an arithmetic and control unit (ACU), real time sensor data from a sensing system. The at least one processor may obtain, via the ACU, one or more tasks during the processing of the real time sensor data. The at least one processor may classify, via the ACU, the one or more tasks into real time vehicle controlling (VC) tasks and non real time VC tasks. The at least one processor may send the real time VC tasks to at least one dedicated processing core of the ACU for processing the real time VC tasks and generating one or more real time VC commands accordingly.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of example embodiments. These example embodiments are described in detail with reference to the drawings. The drawings are not to scale. These embodiments are non-limiting example embodiments, in which like reference numerals represent similar structures throughout the several views of the drawings, and wherein.

DETAILED DESCRIPTION

Figure 1:
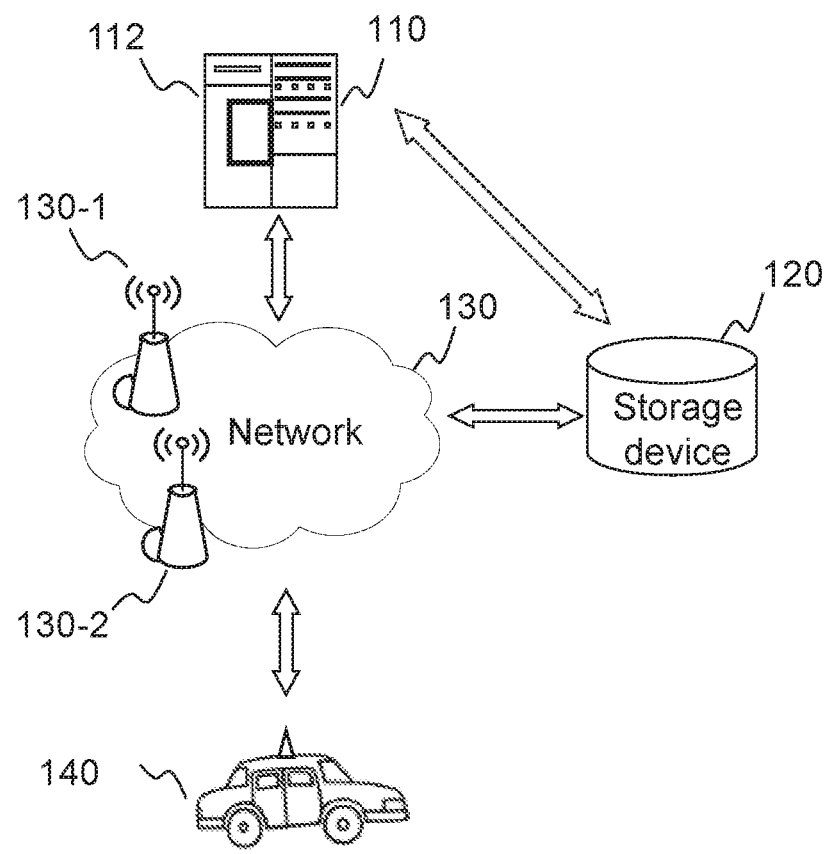
FIG. 1 is a schematic diagram illustrating an autonomous vehicle service system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is to describe particular example embodiments only and is not intended to be limiting. As used herein, the singular forms "a," "an," and "the" may be intended to include the plural forms as well, unless the context clearly indicates otherwise. It will be further understood that at least one of the terms "comprise," "comprises," and "comprising," "include," "includes," and "including," when used in this specification, specify the presence of at least one of stated features, integers, steps, operations, elements, and components, but do not preclude the presence or addition of at least one of one or more other features, integers, steps, operations, elements, components, and groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the systems and methods disclosed in the present disclosure are described primarily regarding operating an autonomous vehicle, it should be understood that these are only examples of various embodiment of the present disclosure. The system or method of the present disclosure may be applied to any other kind of automatic control system. For example, the system or method of the present disclosure may be applied to transportation systems of different environments including land, ocean, aerospace, or the like, or any combination thereof. The autonomous vehicle of the transportation systems may include a taxi, a private car, a hitch, a bus, a train, a bullet train, a high-speed rail, a subway, a vessel, an aircraft, a spaceship, a hot-air balloon, a driverless vehicle, or the like, or any combination thereof.

Various embodiments of the present disclosure may be applied to an autonomous vehicle including an autonomous pilot system. The autonomous pilot system may be used to control the autonomous driving of the vehicle. An arithmetic and control unit (ACU) of the autonomous vehicle may receive and process real time sensor data from a sensing system of the autonomous vehicle. The ACU may obtain one or more tasks during processing of the real time sensor data. The ACU may classify the one or more tasks into real time vehicle controlling (VC) tasks and non real time VC tasks. To process the real time VC tasks in time, at least one dedicated processing core of the ACU may be configured to process the real time VC tasks to generate one or more real time VC commands. The one or more real time VC commands may include but not limited to acceleration, deceleration, making a turn, switching lanes, or the like, or any combination thereof. The one or more VC commands may be sent to a vehicle controlling unit (VCU) of the autonomous vehicle instantly through a real-time transmission unit. The real-time transmission unit may focus on inter-process communication (IPC) between the ACU and the VCU to reduce a time delay of the signal transmission between the ACU and VCU.

FIG. 1 is a schematic diagram illustrating an autonomous vehicle service system according to some embodiments of the present disclosure. In some embodiments, autonomous vehicle service system 100 may be an Internet of Things (IoT) platform including a server 110, a storage device 120, a network 130, an autonomous vehicle 140. The server 110 may further include a processing device 112.

In some embodiments, the server 110 may be a single server, or a server group. The server group may be centralized, or distributed (e.g., the server 110 may be a distributed system). In some embodiments, the server 110 may be local or remote. For example, the server 110 may access at least one of information and data stored in at least one of the autonomous vehicle 140, and the storage device 120 via the network 130. As another example, the server 110 may be directly connected to at least one of the autonomous vehicle 140, and the storage device 120 to access stored at least one of information and data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the server 110 may include a processing device 112. The processing device 112 may process at least one of information and data from the autonomous vehicle(s) 140. For example, the processing device 112 may receive a service request from a user (e.g., a driver or a passenger). In some embodiments, the service request may include at least one of a pick-up location and a drop-off location. The processing device 112 may provide one or more routes from the pick-up location to the drop-off location. The processing device 112 may send the one or more routes to the autonomous vehicle 140 via the network 130. In some embodiments, the service request may include entertainment needs (e.g., music needs, radio needs, movie needs, reading needs, etc.) from the user, the processing device 112 may provide sources to satisfy the entertainment needs of the user in response to the service request. In some embodiments, the service request may include one or more commands to operate the autonomous vehicle 140, for example, parking, slowing down, accelerating, controlling in-car temperature, etc. The processing device 112 may remotely operate the autonomous vehicle 140 via a built-in autonomous pilot system in response to the one or more commands. In some embodiments, the processing device 112 may include one or more processing engines (e.g., a single-core processor or a multi-core processor). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The storage device 120 may at least one of store data and instructions. In some embodiments, the storage device 120 may store data obtained from the autonomous vehicle 140. In some embodiments, the storage device 120 may store at least one of data and instructions that the server 110 may execute or use to perform example methods described in the present disclosure. In some embodiments, the storage device 120 may include a mass storage, a removable storage, a volatile read-and-write memory, a read-only memory (ROM), or the like, or any combination thereof. Example mass storage may include a magnetic disk, an optical disk, a solid-state drive, etc. Example removable storage may include a flash drive, a floppy disk, an optical disk, a memory card, a zip disk, a magnetic tape, etc. Example volatile read-and-write memory may include a random access memory (RAM). Example RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Example ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 120 may be connected to the network 130 to communicate with one or more components of the autonomous vehicle service system 100 (e.g., the server 110, the autonomous vehicle 140). One or more components in the autonomous vehicle service system 100 may access the data or instructions stored in the storage device 120 via the network 130. In some embodiments, the storage device 120 may be directly connected to or communicate with one or more components in the autonomous vehicle service system 100 (e.g., the server 110, the autonomous vehicle 140). In some embodiments, the storage device 120 may be part of the server 110.

The network 130 may facilitate exchange of at least one of information and data. In some embodiments, one or more components in the autonomous vehicle service system 100 (e.g., the server 110, the storage device 120, and the autonomous vehicle 140) may send at least one of information and data to other component(s) in the autonomous vehicle service system 100 via the network 130. For example, the server 110 may obtain/acquire vehicle at least one of information and environment information around the vehicle via the network 130. In some embodiments, the network 130 may be any type of wired or wireless network, or combination thereof. Merely by way of example, the network 130 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 130 may include one or more network access points. For example, the network 130 may include wired or wireless network access points such as at least one of base stations and internet exchange points 130-1, 130-2, . . . , through which one or more components of the autonomous vehicle service system 100 may be connected to the network 130 to exchange at least one of data and information.

In some embodiments, the autonomous vehicle 140 may include structures of a conventional vehicle, for example, a chassis, a suspension, steering, a braking, drivetrain components, an engine, and so on. In some embodiments, the autonomous vehicle 140 may include vehicles having various autonomous driving levels, such as, level 0 (i.e., No Automation, at level 0, the driver performs all operating tasks like steering, braking, accelerating or slowing down, and so forth), level 1 (i.e., Driver Assistance, at level 1, the vehicle can assist with some functions, but the driver still handles all accelerating, braking, and monitoring of the surrounding environment), level 2 (i.e., Partial Automation, at level 2, the vehicle can assist with steering or acceleration functions and allow the driver to disengage from some of their tasks, but the driver must always be ready to take control of the vehicle and is still responsible for most safety-critical functions and all monitoring of the environment), level 3 (i.e., Conditional Automation, at level 3, the vehicle itself controls all monitoring of the environment, and the driver's attention is still critical at this level, but can disengage from "safety critical" functions like braking and leave it to the technology when conditions are safe), level 4 (i.e., High Automation, at level 4, the vehicle is capable of steering, braking, accelerating, monitoring the vehicle and roadway as well as responding to events, determining when to change lanes, turn, and use signals. However, the automatic pilot system would first notify the driver when conditions are safe, and only then does the driver switch the vehicle into the auto pilot mode), or level 5 (e.g., Complete Automation, at level 5, this level of autonomous driving requires absolutely no human attention. There is no need for pedals, brakes, or a steering wheel, as the automatic pilot system controls all critical tasks, monitoring of the environment and identification of unique driving conditions like traffic jams). In some embodiments, the autonomous vehicle 140 may be configured with one or more sensors to detect at least one of internal information and external information surrounding the vehicle. For example, the external information may include environment information surrounding the vehicle, such as weather information, road condition information, traffic light information, obstacle information, and so on. The internal information may include energy information, vehicle pose information, speed information, user interaction information, and so on. In some embodiments, the autonomous vehicle 140 may be configured with a computing device for controlling the autonomous vehicle in real time or near real time according to at least one of the internal information and external information. As used herein, the computing device may refer to an arithmetic and control unit (ACU). In some embodiments, the ACU may be configured with an autonomous pilot system for controlling the autonomous vehicle. The ACU may include a multi-core processor for processing one or more tasks from the autonomous pilot system. In some embodiments, at least one dedicated processing core of the ACU may be dedicated to process one or more real time vehicle controlling (VC) tasks to generate one or more real time VC commands according to the real time sensor data. Another processing core(s) of the ACU may be dedicated to process one or more non real time VC tasks to generate non real time VC commands. In some embodiments, at least one of the real time VC commands and the non real time VC commands may be transmitted to a vehicle controlling unit (VCU) for operating the vehicle. The VCU may include one or more controllers of the autonomous vehicle, for example, one or more throttle controllers, one or more spark controllers, one or more brake controllers, one or more steering controllers, an exhaust gas recycling (EGR) controller, a waste gate controller, and so on.

In some embodiments, the autonomous vehicle 140 may communicate with one or more components of the autonomous vehicle service system 100 (e.g., the server 110, the storage device 120) via the network 130. In some embodiments, the autonomous vehicle 140 may communicate with other vehicles (not shown in FIG. 1) around the vehicle itself. For example, a first vehicle may obtain at least one of distance information and speed information regarding a second vehicle. When the second vehicle is so close to the first vehicle (e.g., a distance between two vehicles is less than or equal to a distance threshold), the first vehicle may send an alert information to the second vehicle, which may avoid a potential vehicle accident.

Figure 2:
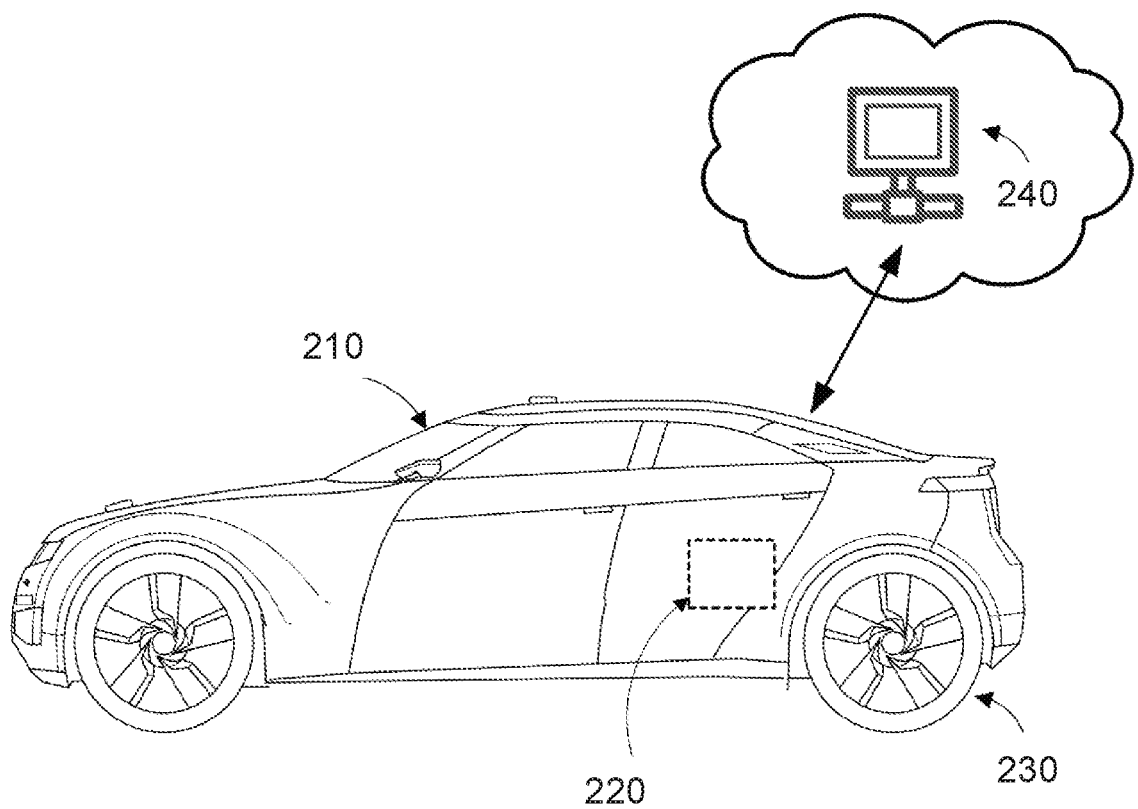
FIG. 2 is a schematic diagram illustrating an autonomous vehicle according to some embodiments of the present disclosure.

FIG. 2 is a schematic diagram illustrating an autonomous vehicle according to some embodiments of the present disclosure. As illustrated in FIG. 2, the autonomous vehicle 140 may be an electric vehicle, a fuel cell vehicle, a hybrid vehicle, or a conventional internal combustion engine vehicle. The autonomous vehicle 140 may include a body 210 and at least one wheel 230. The body 210 may include various body styles, such as a sports vehicle, a coupe, a sedan, a pick-up truck, a station wagon, a sports utility vehicle (SUV), a minivan, or a conversion van. In some embodiments, the autonomous vehicle 140 may include a pair of front wheels and a pair of rear wheels, as illustrated in FIG. 2. In some embodiments, the autonomous vehicle 140 may have more or less wheels or equivalent structures that enable vehicle 140 to move around. The autonomous vehicle 140 may be configured to be all wheel drive (AWD), front wheel drive (FWR), or rear wheel drive (RWD). In some embodiments, the autonomous vehicle 140 may be configured to be operated by at least one of an operator occupying the vehicle, remotely controlled, and autonomously controlled.

As described in connection with FIG. 1, the autonomous vehicle 140 may be equipped with an automatic pilot system 220 configured to control the autonomous vehicle 140. The automatic pilot system 220 may be implemented by an arithmetic and control unit (ACU) 240. The autonomous pilot system 220 may be configured to operate the vehicle automatically. In some embodiments, the autonomous pilot system 220 may obtain at least one of data and information from one or more sensors of the vehicle. In some embodiments, the autonomous pilot system 220 may be categorized to three layers, that is, perception, planning, and control. The autonomous pilot system 220 may perform one or more operations regarding at least one of the perception, the planning and the control. For example, in the perception layer, the autonomous pilot system 220 may perform at least one of environment perception and localization based on the sensor data, such as weather detection, in-car temperature detection, lane detection, free drivable area detection, pedestrian detection, obstacle detection, traffic sign detection, and so on. As another example, in the planning layer, the autonomous pilot system 220 may perform at least one of a mission planning, a behavior planning, and a motion planning according to at least one of the environment perception and localization. As a further example, in the control layer, the autonomous pilot system 220 may generate one or more real time VC commands according to results of the perception layer and the planning layer. Specifically, the autonomous pilot system 220 may generate the one or more real time VC commands based on at least one of feedback control and model predictive control. More descriptions regarding the embodiments with respect to the perception layer, the planning layer, and the control layer may be found in, e.g., an article "Pendleton, Scott Drew, et al. "Perception, planning, control, and coordination for autonomous vehicles." *Machines* 5.1 (2017): 6", the contents of which are hereby incorporated by reference.

The autonomous vehicle 140 may include one or more sensors to provide information that is used to operate the vehicle automatically. The one or more sensors may detect at least one of internal information and external information regarding the autonomous vehicle 140 in real time or near real time. For example, the external information may include environment information around the vehicle, such as weather information, road condition information, traffic light information, obstacle information, and so on. The internal information may include energy information, vehicle pose information, speed information, user interaction information, and so on. The one or more sensors may include but not limited to a LiDAR, a camera, a radar, a GPS receiver, a pose angle sensor, a speed sensor, a distance sensor, and so on. It is understood that the one or more sensors may also include various types of sensors, such as laser-sensing systems, infrared-sensing systems, acoustic-sensing systems, thermal-sensing systems, or the like, or any combination thereof.

In some embodiments, the autonomous vehicle 140 may at least be configured with a positioning system. The positioning system may provide navigation information for the autonomous vehicle 140. The navigation information may include a current location of the vehicle, a destination of the vehicle, a velocity, an acceleration, a current time, or the like, or any combination thereof. The location may be in the form of coordinates, such as a latitude coordinate and a longitude coordinate. The positioning system may include but not limited to a compass navigation system (COMPASS), a global positioning system (GPS), a BeiDou navigation satellite system, a Galileo positioning system, a quasi-zenith satellite system (QZSS), and so on.

Figure 3:
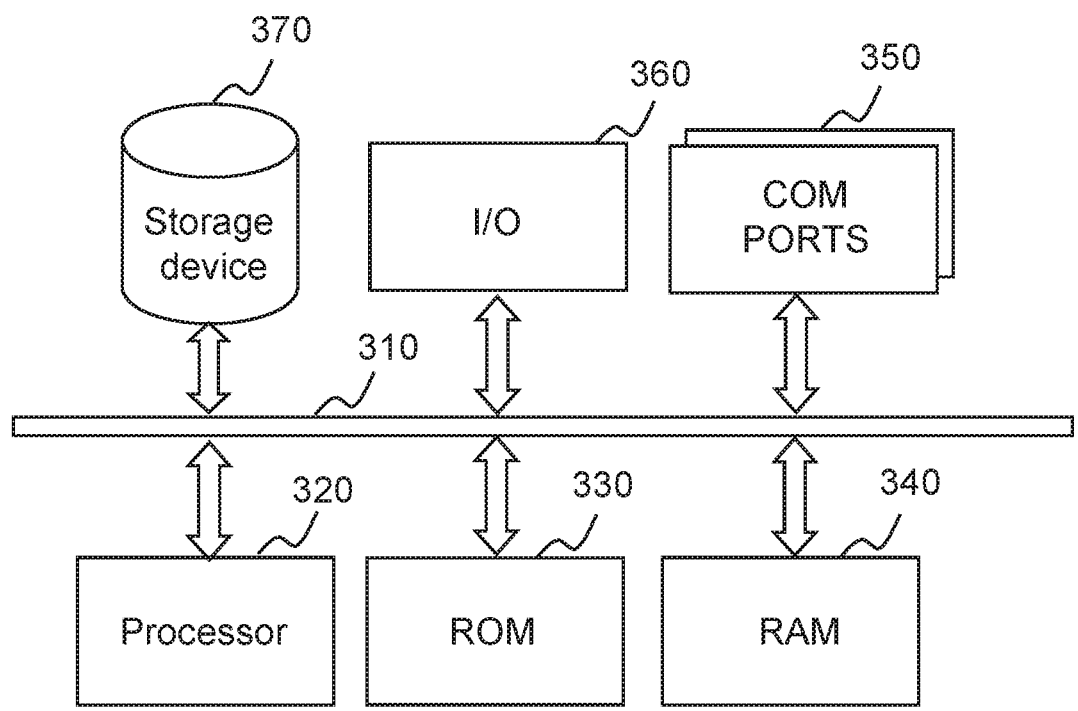
FIG. 3 is a schematic diagram illustrating components of a computing device according to some embodiments of the present disclosure.

FIG. 3 is a schematic diagram illustrating components of a computing device according to some embodiments of the present disclosure. In some embodiments, the server 110 and the storage device 120 illustrated in FIG. 1, the ACU 240 illustrated in FIG. 2 may be implemented on the computing device 300. For example, the ACU 240 may be implemented on the computing device 300 and configured to perform functions of the ACU 240 disclosed in this disclosure.

The computing device 300 may be a general-purpose computer or a special purpose computer, both may be used to implement the autonomous vehicle service system 100, or the autonomous pilot system 220 disclosed in the present disclosure. The computing device 300 may be used to implement any component of the autonomous vehicle service system 100, or the autonomous pilot system 220 as described herein. For example, the processing device 112 may be implemented on the computing device 300, via its hardware, software program, firmware, or a combination thereof. As another example, the ACU 240 may be implemented on the computing device 300, via its hardware, software program, firmware, or a combination thereof. Although only one such computer is shown, for convenience, the computer functions relating to the search service as described herein may be implemented in a distributed fashion on a number of similar platforms to distribute the processing load.

The computing device 300, for example, may include COM ports 350 connected to and from a network connected thereto to facilitate data communications. The computing device 300 may also include a processor 320, in the form of one or more processors or multi-core processors, for executing program instructions. The example computer platform may include an internal communication bus 310, program storage and data storage of different forms, for example, a storage device 370, and a read only memory (ROM) 330, or a random access memory (RAM) 340, for various data files to be at least one of processed and transmitted by the computer. The example computer platform may also include program instructions stored in at least one of the ROM 330, RAM 340, and other type of non-transitory storage medium to be executed by the processor 320. At least one of the methods and processes of the present disclosure may be implemented as the program instructions. The computing device 300 may also include an I/O component 360, supporting input/output between the computer and other components therein. The computing device 300 may also receive programming and data via network communications.

The computing device 300 may also include a hard disk controller communicated with a hard disk, a keypad/keyboard controller communicated with a keypad/keyboard, a serial interface controller communicated with a serial peripheral equipment, a parallel interface controller communicated with a parallel peripheral equipment, a display controller communicated with a display, or the like, or any combination thereof.

Merely for illustration, only at least one of one CPU and processor is described in the computing device 300. However, it should be noted that the computing device 300 in the present disclosure may also include at least one of multiple CPUs and processors, thus at least one of operations and method steps that are performed by at least one of one CPU and processor as described in the present disclosure may also be jointly or separately performed by at least one of the multiple CPUs and processors. For example, if in the present disclosure at least one of the CPU and processor of the computing device 300 executes both operation A and operation B, it should be understood that operation A and operation B may also be performed by at least one of two different CPUs and processors jointly or separately in the computing device 300 (e.g., the first processor executes operation A and the second processor executes operation B, or the first and second processors jointly execute operations A and B).

Figure 4:
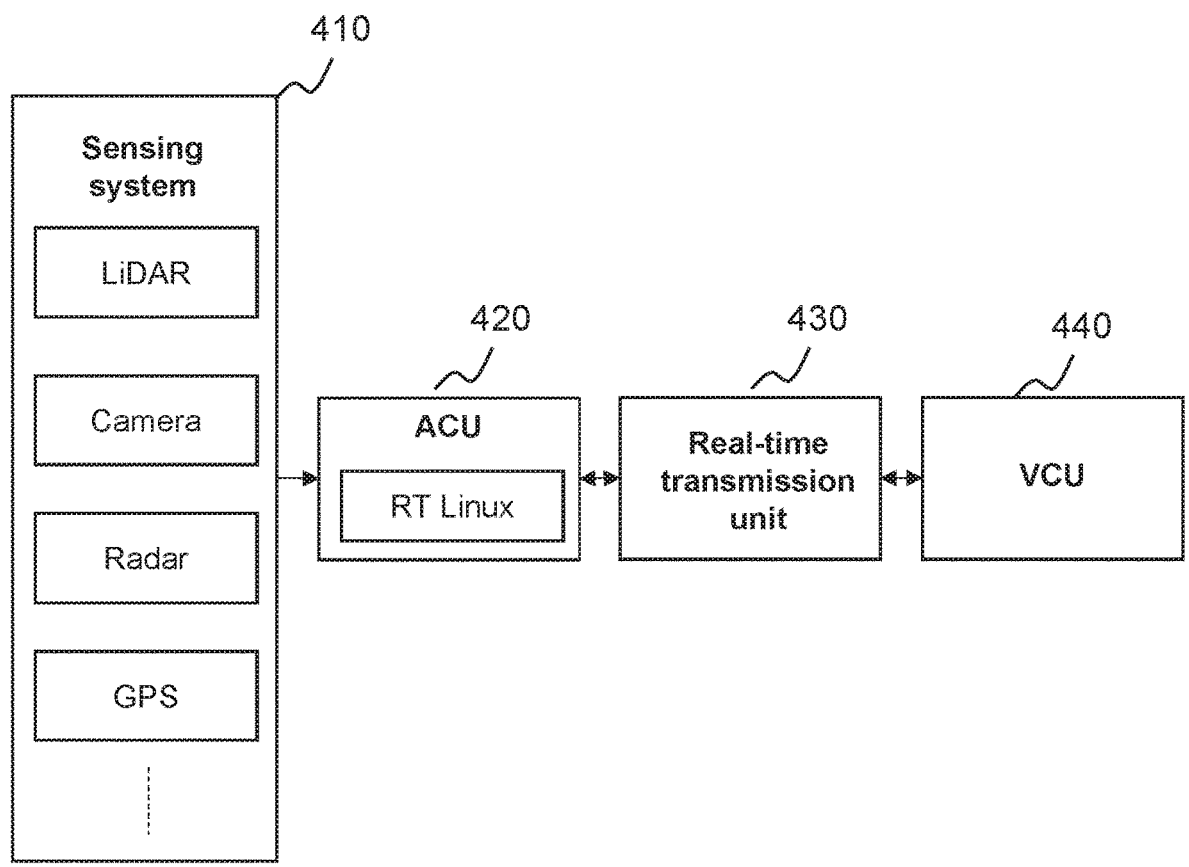
FIG. 4 is a schematic diagram illustrating a simplified system for operating an autonomous vehicle according to some embodiments of the present disclosure.

FIG. 4 is a schematic diagram illustrating a simplified system for operating an autonomous vehicle according to some embodiments of the present disclosure. As illustrated in FIG. 4, the autonomous vehicle 400 may include a sensing system 410, an arithmetic and control unit (ACU) 420, a real-time transmission unit 430 and a vehicle controlling unit (VCU) 440.

The sensing system 400 may include one or more sensors to detect at least one of internal information and external information regarding the vehicle. For example, the external information may include environment information around the vehicle, such as weather information, road condition information, traffic light information, obstacle information, and so on. The internal information may include energy information, vehicle pose information, speed information, user interaction information, and so on. The one or more sensors may include but not limited to a LiDAR, a camera, a radar, a GPS receiver, a pose angle sensor, a speed sensor, a distance sensor, and so on. The sensor data from the sensing system 410 may be sent to the ACU 420 via one or more network interfaces (e.g., a control area network (CAN) bus) in real time.

The ACU 420 may be configured to process the sensor data in order to operate the vehicle automatically. In some embodiments, the ACU 420 may implement an autonomous pilot system (e.g., the autonomous pilot system 240 of FIG. 2) for operating the vehicle automatically. As described in connection with FIG. 2, the autonomous pilot system may be categorized to three layers, that is, perception, planning, and control. The autonomous pilot system may perform one or more operations regarding at least one of the perception, planning and control to control the autonomous vehicle.

In some embodiments, the perception refers to an ability of the autonomous pilot system to collect information and extract relevant knowledge from the environment. Example perception layer may include one or more operations regarding environmental perception, localization, or the like, or any combination thereof. The environmental perception refers to developing a contextual understanding of environment, such as where obstacles are located, detection of road signs/marking, and so on. For example, the one or more operations regarding the perception may include weather detection, in-car temperature detection, lane detection, free drivable area detection, pedestrian detection, obstacle detection, traffic sign detection, or the like, or any combination thereof. In some embodiments, the localization refers to determining the pose (position and orientation) of the vehicle and measuring its own motion with respect to the environment. The vehicle may be localized by satellite-based navigation systems and inertial navigation systems. For example, the satellite-based navigation systems, such as GPS and GLONASS, may provide a regular fix on the global position of the vehicle. As another example, the inertial navigation systems may estimate the attitude of the vehicle by using accelerometer, gyroscope, and signal processing techniques. In some embodiments, the one or more operations regarding the localization may include vehicle position localization, vehicle attitude estimation, or the like, or any combination thereof.

In some embodiments, the planning refers to the process of making purposeful decisions in order to achieve the autonomous driving of the vehicle, typically to bring the vehicle from a start location to a goal location while avoiding obstacles. Example planning layer may include one or more operations regarding mission planning, behavior planning, motion planning. In some embodiments, the mission planning may be referred to as route planning, for example, planning one or more routes from the starting location to the goal location. The mission planning may be achieved according to a classical algorithm, such as, the Dijkstra's Algorithm or the A* Algorithm. In some embodiments, the behavior planning may be referred to as decision making. For the behavior planning, one or more decisions may be made, which ensure the vehicle follows stipulated road rules and interacts with other agents (e.g., other vehicles or pedestrians) in a conventional, safe manner. For example, the one or more decisions may include overtake, proceed through an intersection, acceleration, deceleration, make a turn, switch lanes, and so on. In some embodiments, the motion planning may refer to the process of deciding on a sequence of actions to reach a specified goal, for example, avoiding collisions with obstacles. The motion planning may be achieved according to a combinatorial planning algorithm, or a sampling-based planning algorithm.

In some embodiments, the control may include one or more operations regarding the motion control. In some embodiments, a control scheme, such as a feedback control or a model predictive control, may be used to achieve the control of the vehicle. One or more control commands may be generated. The one or more control commands may be used to direct the VCU to perform corresponding operation, such as overtake, proceed through an intersection, acceleration, deceleration, make a turn, switch lanes.

For the sake of operating the vehicle automatically in real time, a real time operating systems may be implemented on the ACU 420, for example, a real time Linux (RT Linux) system. The autonomous pilot system may be designated as a programmable system based on the RT Linux system. The RT Linux system may be configured to schedule one or more tasks from one or more layers of the autonomous pilot system. Specifically, at least one kernel of the RT Linux system may obtain one or more tasks from the layers of the autonomous pilot system. The at least one kernel may classify the one or more tasks into real time VC tasks and non real time VC tasks. The real time VC task may be defined as a hard real time task that needs to be completed within a critical time period such as 5 ms, 10 ms, 15 ms, 20 ms, etc. If the system fails to complete the hard real time task during the critical time period, it may cause an error of the autonomous pilot system and an accident for the vehicle. When the autonomous pilot system fails to complete the hard real time task during the critical time period, it may be disabled or irresponsible. The non real time VC task may be defined as a soft real time task that can be completed exceed the critical time period. Even if the system fails to complete the soft real time task within the critical time period, it is unlikely to cause a fatal error of the autonomous pilot system. When the autonomous pilot system fails to complete the soft real time task during the critical time period, the autonomous pilot system may still work normally. In some embodiments, the critical time period may be adjusted according to different goals or scenarios, for example, adjusting the critical time period to higher or lower. In some embodiments, the at least one kernel may designate the real time VC task as a high priority task to be processed. Thus, the at least one kernel may prioritize and assign the real time VC task to at least one dedicated processing core of the ACU 420 (e.g., dedicated processing core(s) illustrated in FIG. 6) for further processing. The at least one dedicated processing core may process the real time VC task according to real time sensor data and generate one or more real time VC commands accordingly. By contrast with the real time VC task, the at least one kernel may designate the non real time VC task as a relatively low priority task to be processed. The at least one kernel may cache the non real time VC task to other processing cores of the ACU 420 (e.g., other processing core(s) illustrated in FIG. 6). The other processing core may process the non real time VC task, and generate non real time VC commands accordingly.

In some embodiments, the one or more real time VC commands may be sent the VCU 440 through the real-time transmission unit 430. The real-time transmission unit 430 may be configured to achieve an inter-process communication (IPC) between the ACU 420 and the VCU 440. The real-time transmission unit 430 may send the one or more real time VC commands to the VCU 440 to operate the vehicle automatically in real time.

In some embodiments, the real-time transmission unit 430 may be configured to interact with both the ACU 420 and VCU 440. The real-time transmission unit 430 may be designated as a middle layer to connect the ACU 420 and the VCU 440. In some embodiments, the real-time transmission unit 430 may be an individual unit separate from the ACU 420 and the VCU 440. For example, the real-time transmission unit 430 may include at least one processor dedicate to interacting with both the ACU 420 and VCU 440. The real-time transmission unit 430 may send the real time VC command to the VCU 440 in real time.

In some embodiments, when the ACU 420 is disabled or irresponsive, for example, the ACU 420 is down due to a physical damage or an application bug, the real-time transmission unit 430 may be configured to control the vehicle instead of the ACU 420. For example, the real-time transmission unit 430 may send a real time VC command for slowing down the vehicle until the vehicle is stopped. As another example, the real-time transmission unit 430 may send an alert signal (e.g., an audio signal, a light signal, a video signal, etc.) to remind the user to take over the vehicle. In some embodiments, the alert signal may be used to remind surrounding vehicles to avoid.

In some embodiments, during the autonomous driving, the sensor data may be updated continuously in real time.

The ACU 420 may generate updated real time VC commands based on the updated sensor data accordingly. The real time VC commands may be sent to the VCU 440 via the real-time transmission unit 430. There may be a time interval between the real time VC command and its immediate updated real time VC command. In some embodiments, if the time interval is shorter than or equal to an interval threshold such as 10 ms, 20 ms, 30 ms, the VCU 440 may receive the updated real time VC command instantly via the real-time transmission unit 430, and control the vehicle in response to the updated real time VC command. In some embodiments, if the time interval is longer than the interval threshold, the ACU 420 may determine whether the difference between the time interval and interval threshold is within a time limit, such as, 3 ms, 5 ms, 7 ms. If the difference is shorter than or equal to the time limit, the real-time transmission unit 430 may repeat or maintain current real time VC command to the VCU 440, and the VCU 440 may continue to perform the current real time VC command so as to maintain the current state of the vehicle. If the difference is longer than the time limit, the real-time transmission unit 430 may generate a real time VC command to directly command VCU to slow down the vehicle. In other words, if the real-time transmission unit 430 does not receive the updated real time command within the interval threshold, the real-time transmission unit 430 may directly generate a real time VC command to command the VCU to slow down the vehicle directly in order to reduce security risks. Upon receipt of the real time VC command for slowing down, the VCU 440 may slow down the vehicle by a braking controller. In some embodiments, if the real-time transmission unit 430 does not receive the updated real time command within the interval threshold, the real-time transmission unit 430 may also generate an alert signal for reminding the user of the vehicle (e.g., a driver or a passenger) to take over the vehicle. The user may drive the vehicle manually instead of the autonomous driving. In some embodiments, the alert signal may be used to remind surrounding vehicles to avoid.

The VCU 440 may include one or more controllers of the autonomous vehicle, for example, one or more throttle controllers, one or more spark controllers, one or more brake controllers, one or more steering controllers, an exhaust gas recycling (EGR) controller, a waste gate controller, and so on. The VCU 440 may be configured to achieve one or more actions related to propulsion, steering and braking. For example, in response to a real time command for switching lanes, the steering controller may adjust a steering angle by 0.5 degree, and the brake controller may increase a brake fluid by 1.5 bar.

Figure 5:
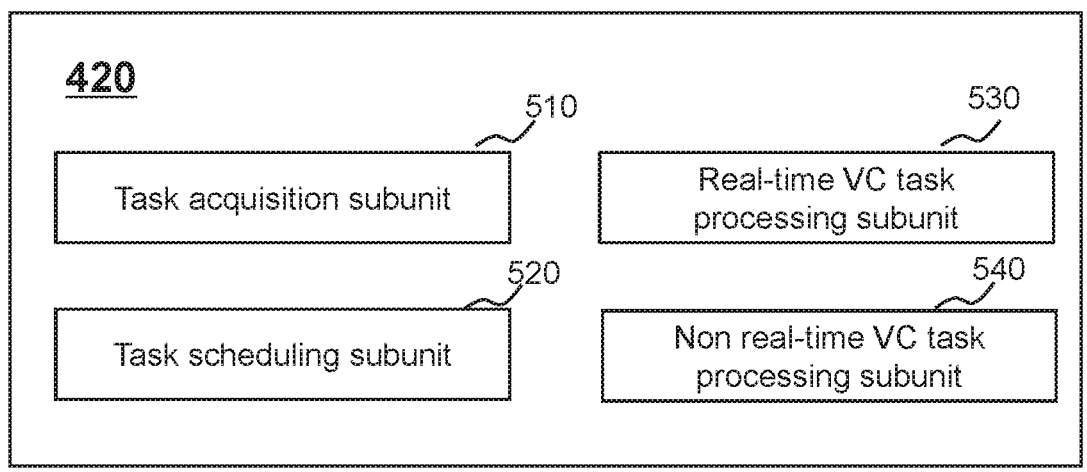
FIG. 5 is a block diagram illustrating the components of an arithmetic and control unit (ACU) according to some embodiments of the present disclosure.

FIG. 5 is a block diagram illustrating the components of an example arithmetic and control unit (ACU) according to some embodiments of the present disclosure. In some embodiments, the ACU 420 may be in communication with a computer-readable storage medium (e.g., the storage device 120, the storage device 370, ROM 320, or RAM 330) and may execute instructions stored in the computer-readable storage medium to perform methods described in the present disclosure. In some embodiments, the ACU 420 may include a multiple core processor. The ACU 420 may include a task acquisition subunit 510, a task scheduling subunit 520, a real-time VC task processing subunit 530, and a non real-time VC task subunit 540.

The task acquisition subunit 510 may obtain one or more tasks from at least one layer of an autonomous pilot system of an autonomous vehicle. The autonomous pilot system may be used to operate the vehicle automatically. In some embodiments, the autonomous pilot system may be categorized into three layers, that is, perception, planning, and control. One or more operations regarding each layer of the autonomous pilot system may include one or more tasks to be processed by the processor of the ACU. For example, in the perception layer, the perception tasks may include one or more tasks regarding weather detection, in-car temperature detection, lane detection, free drivable area detection, pedestrian detection, obstacle detection, traffic sign detection, or the like, or any combination thereof. As another example, in the planning layer, the planning tasks may include one or more tasks regarding at least one of mission planning, behavior planning, and motion planning. As a further example, in the control layer, the control tasks may include one or more tasks regarding the motion control, for example, one or more tasks of the feedback control, one or more tasks of the model predictive control.

The task scheduling subunit 520 may classify the one or more tasks into real time VC tasks and non real time VC tasks. In some embodiments, the real time VC task may be defined as a hard real time task to be completed within a critical time period (e.g., 5 ms, 10 ms, 15 ms, 20 ms, etc). The non real time VC task may be defined as a soft real time task that can be completed exceed the critical time period. The task scheduling subunit 520 may determine whether a task is the real time VC task or the non real time VC task according to a predefined rule. For example, the critical time period may be set in the predefined rule. Let the critical time period be 10 ms. If a task needs to be completed within the critical time period, the task may be designated as the real time VC task, for example, a task for generating a braking command. Otherwise, the task may be designated as the non real time VC task, for example, a task for generating an in-car temperature adjustment command.

In some embodiments, the task scheduling subunit 520 may prioritize and schedule the real time VC tasks to the real-time task processing subunit 530 for processing the real time VC tasks. The real-time task processing subunit 530 may generate one or more real time VC commands. Example real time VC command may include acceleration, deceleration, making a turn, and switching lanes. The task scheduling subunit 520 may schedule the non real time VC tasks to the non real-time VC task subunit 540 for processing the non real time VC tasks. The non real-time VC task subunit 540 may generate one or more non real time VC commands. Example non real time VC command may include but not limited to adjusting in-car temperature, adjusting seat position, opening display, listening to radio, or the like, or any combination thereof.

In some embodiments, the real-time VC task processing subunit 530 may include at least one dedicated processing core of the multi-core processor. The non real-time VC task subunit 540 may include other processing core of the multi-core processor. In some embodiments, if the real time VC tasks and the non real time VC tasks are queued to be processed by the same processor, the real time VC tasks may be not processed in time because of the restriction of the FIFO (First in First Out) mechanism. For example, if the real time VC task is later than the non real time VC task in the task queue, the processor may process the non real time VC task ahead of the real time VC task according to the FIFO mechanism. As a result, the real time VC task may not be processed in time. To resolve this issue, the at least one dedicated processing core may be specified to process real time VC task only, excluding non real time VC task, to ensure the real time VC task is processed in time.

It should be noted that the descriptions above in relation to the ACU 420 is provided for the purposes of illustration, and not intended to limit the scope of the present disclosure. For persons having ordinary skills in the art, various variations and modifications may be conducted under the guidance of the present disclosure. However, those variations and modifications do not depart the scope of the present disclosure. In some embodiments, the ACU 420 may include one or more other subunits. For example, the ACU 420 may include a storage subunit to store data generated by the subunits in the ACU 420. In some embodiments, any two of the subunits may be combined as a single unite.

Figure 6:
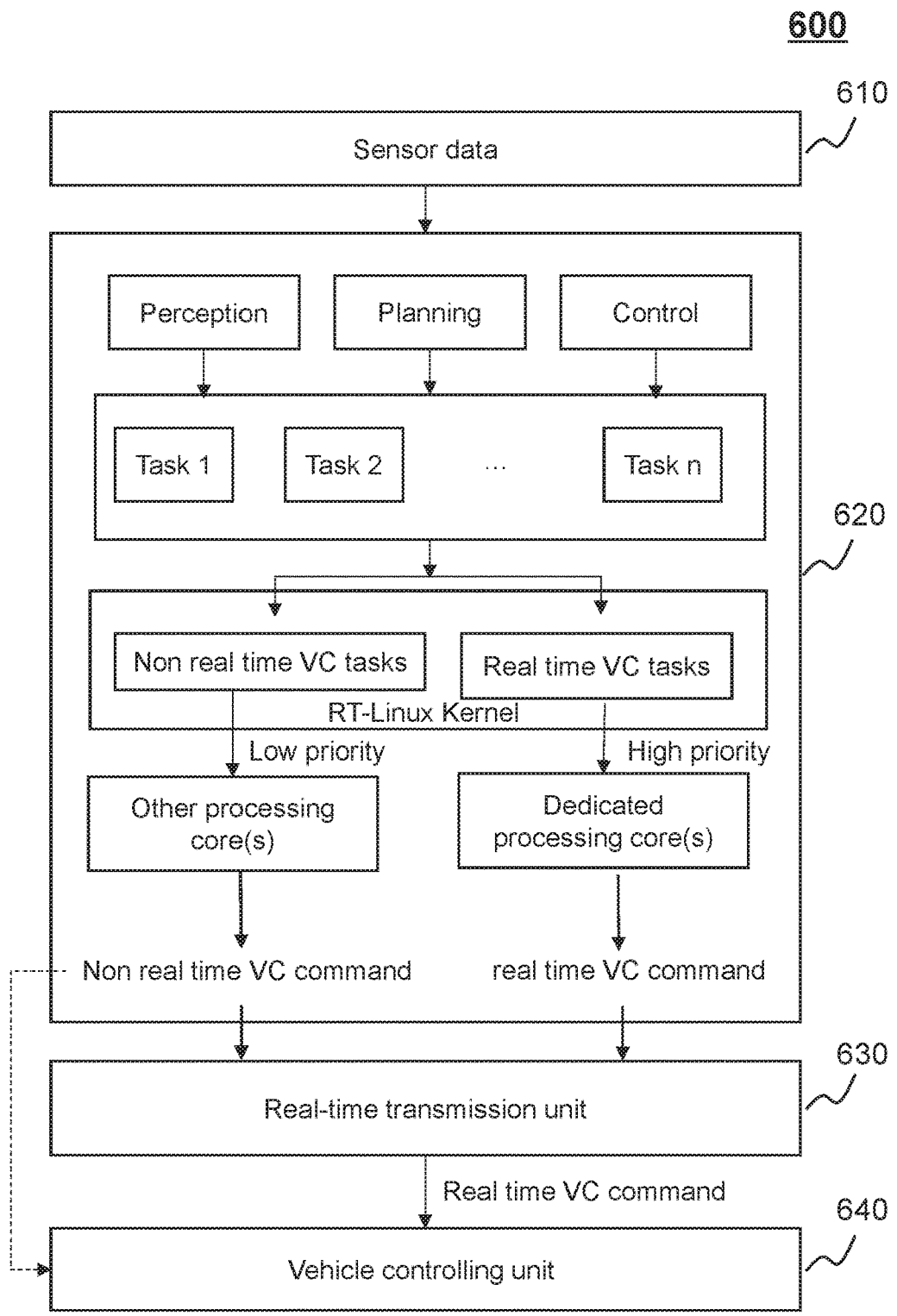
FIG. 6 is a schematic diagram illustrating the work flow of an autonomous vehicle among the components of FIG. 5 according to some embodiments of the present disclosure.

FIG. 6 is a schematic diagram illustrating the work flow of an autonomous vehicle among the components of FIG. 5 according to some embodiments of the present disclosure. In block 610, sensor data may be obtained from a sensing system (e.g., the sensing system 410) of an autonomous vehicle. The sensor data may include at least one of internal information and external information surrounding the vehicle. For example, the external information may include environment information surrounding the vehicle, such as weather information, road condition information, traffic light information, obstacle information, and so on. The internal information may include energy information, vehicle pose information, speed information, user interaction information, and so on.

In block 620, the sensor data may be sent to an autonomous pilot system implemented on the ACU of the autonomous vehicle. As described in connection with FIG. 2 or FIG. 4, the autonomous pilot system may be categorized into three layers, that is, perception, planning, and control. One or more operations regarding each layer of the autonomous pilot system may include one or more tasks to be processed by the processor of the ACU. For example, in the perception layer, the perception tasks may include one or more tasks regarding weather detection, in-car temperature detection, lane detection, free drivable area detection, pedestrian detection, obstacle detection, traffic sign detection, or the like, or any combination thereof. As another example, in the planning layer, the planning tasks may include at least one of one or more tasks regarding mission planning, behavior planning, and motion planning. As a further example, in the control layer, the control tasks may include one or more tasks regarding the motion control, for example, one or more tasks of the feedback control, one or more tasks of the model predictive control.

In some embodiments, the one or more tasks may form a task queue to be processed by the processor. However, in the task queue, the one or more tasks may need to be processed according to a first-in-first-out (FIFO) mechanism. In other words, the processor may priority process a task in the front of the queue. Accordingly, the processed priority task may leave the queue firstly. In some embodiments, if a real time VC task has to wait to be processed in the task queue, the real time VC task may not be processed in time, which may cause fatal error of the autonomous pilot system. In the case, the autonomous pilot system may be disabled. To resolve the issue above or similar issue, the one or more VC tasks may be classified into at least one of the real time VC tasks and non real time VC tasks. The real time VC task and the non real time VC task may be processed respectively by individual processing core(s).

In some embodiments, the RT-Linux kernel of the RT Linux system may be used to classify the one or more tasks into at least one of the real time VC tasks and the non real time VC tasks. The RT-Linux kernel may designate the real time VC tasks as a high priority task to be processed, and designate the non real time VC tasks as a relatively low priority task to be processed.

In some embodiments, the real time VC task may be defined as a hard real time task that is completed within a critical time duration (e.g., 5 ms, 10 ms, 15 ms, 20 ms, etc). The non real time VC task may be defined as a soft real task that is allowable to be completed exceed the critical time limit. For those skilled in the art, a task refers to a unit of work, such as a granule of computation, a unit of transmission. In some embodiments, the RT Linux system may be used to predefine which task is the hard real time task or the soft real time task. For example, if a first plurality of tasks need to be completed within ten milliseconds, the first plurality of tasks may be predefined as the real time VC tasks. If a second plurality of tasks may be allowable to be completed exceed ten milliseconds, the second plurality of tasks may be predefined as the non real time VC tasks. The RT Linux kernel may determine whether a task is the real time VC task or the non real time VC task according to the predefined rule.

In some embodiments, the RT Linux kernel may priority assign the real time VC task to dedicated processing core(s). The dedicated processing core(s) may process the real time VC task and generate a real time VC command accordingly. The RT Linux kernel may cache the non real time VC task to other processing cores of the ACU 420 (e.g., other processing core(s) illustrated in FIG. 6). The other processing core(s) may process the non real time VC task and generate a non real time VC command accordingly.

In block 630, the real-time transmission unit may transmit the real time VC command to the vehicle controlling unit (VCU). Example real time VC command may include but not limited to acceleration, deceleration, making a turn, and switching lanes. The real-time transmission unit may include at least one processor dedicate to interacting with both the ACU and VCU. The real-time transmission unit may focus on the transmission of the real time command in regardless of the non real time command, which may send the real time VC command to the VCU instantly.

In block 640, upon receipt of the real time VC command, the VCU may control the vehicle to perform corresponding actions automatically. The VCU may include one or more controllers of the autonomous vehicle, for example, one or more throttle controllers, one or more spark controllers, one or more brake controllers, one or more steering controllers, an exhaust gas recycling (EGR) controller, a waste gate controller, and so on. Merely by ways of example, in response to a real time command for switching lanes, the steering controller may adjust a steering angle by 0.5 degree, and the brake controller may increase a brake fluid by 1.5 bar.

In some embodiments, the VCU may perform the non real time VC command from the other processing core(s). Example non real time VC command may include but not limited to adjusting in-car temperature, adjusting seat position, opening display, listening to radio, and so on. In most case, if the non real time VC command may be not response by the VCU in time, which may not cause fatal security risk during the autonomous driving.

Figure 7:
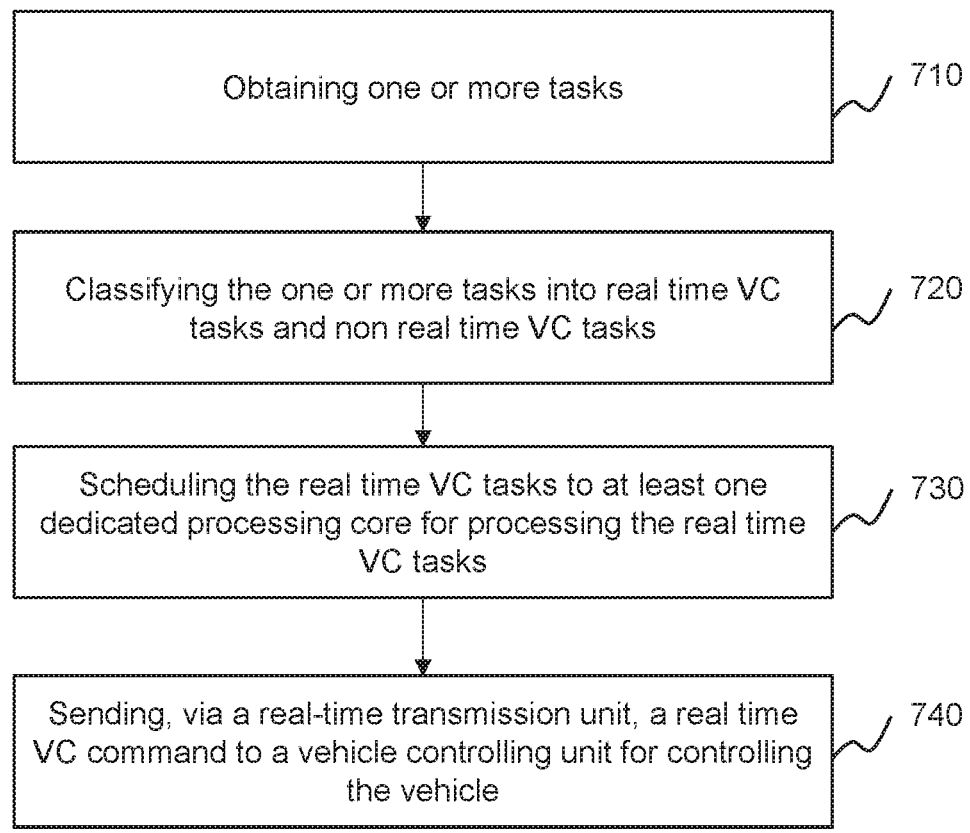
FIG. 7 is a flowchart illustrating a process for operating a vehicle automatically in real time according to some embodiments of the present disclosure.

FIG. 7 is a flowchart illustrating a process for operating a vehicle automatically in real time according to some embodiments of the present disclosure. At least one of the process and method 700 may be executed by at least one computing device in an autonomous vehicle (e.g., the ACU 240 or the computing device 300). For example, at least one of the process and method 700 may be implemented as a set of instructions (e.g., an application) stored in a non-transitory computer readable storage medium (e.g., the storage device 370). At least one processor of the computing device (e.g., the processor 320 of the computing device 300) may execute the set of instructions and may accordingly be directed to perform at least one of the process and method 700 via at least one of receiving and sending electronic signals.

In 710, the processor (e.g., the task acquisition subunit 510) may obtain one or more tasks.

In some embodiments, the processor may obtain the one or more tasks from at least one layer of an autonomous pilot system of an autonomous vehicle. The autonomous pilot system may be used to operate the vehicle automatically. In some embodiments, the autonomous pilot system may be categorized into three layers, that is, perception, planning, and control. One or more operations regarding each layer of the autonomous pilot system may include one or more tasks to be processed by the processor of the ACU. For example, in the perception layer, the perception tasks may include one or more tasks regarding weather detection, in-car temperature detection, lane detection, free drivable area detection, pedestrian detection, obstacle detection, traffic sign detection, or the like, or any combination thereof. As another example, in the planning layer, the planning tasks may include at least one of one or more tasks regarding mission planning, behavior planning, and motion planning. As a further example, in the control layer, the control tasks may include one or more tasks regarding the motion control, for example, one or more tasks of the feedback control, one or more tasks of the model predictive control.

In 720, the processor (e.g., a task scheduling subunit 520) may classify the one or more tasks into real time VC tasks and non real time VC tasks.

In some embodiments, the real time VC task may be defined as a hard real time task that is to be completed within a critical time period (e.g., 5 ms, 10 ms, 15 ms, 20 ms, etc). The non real time VC task may be defined as a soft real task can be completed exceeding the critical time period. For those skilled in the art, a task refers to a unit of work, such as a granule of computation, a unit of transmission. In some embodiments, a real time operating system, such as an RT Linux system, may be used to predefine which task is the hard real time task or the soft real time task. The RT Linux system may be configured to schedule one or more tasks from the layers of the autonomous pilot system. For example, if a first plurality of tasks needs to be completed within ten milliseconds, the first plurality of tasks may be predefined as the real time VC tasks. If a second plurality of tasks can be completed exceeding ten milliseconds, the second plurality of tasks may be predefined as the non real time VC tasks. The task scheduling subunit 520 may determine whether a task is the real time VC task or the non real time VC task according to the predefined rule. The predefined rule may include the critical time period that defines the real time VC task or the non real time VC task.

In 730, the processor (e.g., the task scheduling subunit 520) may prioritize and schedule the real time VC tasks to at least one dedicated processing core (e.g., a real-time task processing subunit 530) for processing the real time VC tasks. In some embodiments, the real-time task processing subunit 530 may include the dedicated processing core(s) illustrated in FIG. 6.

In some embodiments, if the real time VC tasks and the non real time VC tasks are queued to wait to be processed by the same processor, the real time VC tasks may be not processed in time according to the restrict of the FIFO mechanism. For example, if the real time VC task is later than the non real time VC task in the task queue, the processor may had better process the non real time VC task firstly according to the FIFO mechanism. The real time VC task may not processed in time. To resolve this issue, the at least one dedicated processing core may be specified to process the real time VC task excluding the non real time VC task, which may ensure the real time VC task is processed in time.

In some embodiments, the task scheduling subunit 520 may designate the real time VC task as a high priority task to be processed. Thus, the task scheduling subunit 520 may priority schedule the real-time VC task to the real-time task processing subunit 530. The real-time task processing subunit 530 may process the real time VC task and generate a real time VC command. Example real time VC command may include but not limited to acceleration, deceleration, making a turn, and switching lanes. The task scheduling subunit 520 may also designate the non real time VC task as a relatively low priority task to be processed. The task scheduling subunit 520 may cache the non real time VC task to a non real-time task processing subunit 540. In some embodiments, the non real-time task processing subunit 540 may include the other processing core(s) illustrated in FIG. 6. The non real-time task processing subunit 540 may process the non real time VC task and generate a non real time VC command. Example non real time VC command may include but not limited to adjusting in-car temperature, adjusting seat position, opening display, listening to radio, or the like, or any combination thereof.

In 740, the processor (e.g., the real-time task processing subunit 530) may send, via a real-time transmission unit, to the real time VC command to a vehicle controlling unit (VCU) for controlling the vehicle.

In some embodiments, the real-time transmission unit (e.g., the real-time transmission unit 430 illustrated in FIG. 4) may focus on the transmission of the real time command in regardless of the non real time VC command, which may send the real time VC command to the VCU immediately.

In some embodiments, upon receipt of the real time VC command, the VCU may control the vehicle to perform corresponding actions automatically. The VCU may include one or more controllers of the autonomous vehicle, for example, one or more throttle controllers, one or more spark controllers, one or more brake controllers, one or more steering controllers, an exhaust gas recycling (EGR) controller, a waste gate controller, and so on. Merely by ways of example, in response to a real time command for switching lanes, the steering controller may adjust a steering angle by 0.5 degree, and the brake controller may increase a brake fluid by 1.5 bar.

It should be noted that the above description is merely provided for the purpose of illustration, and not intended to limit the scope of the present disclosure. For persons having ordinary skills in the art, multiple variations and modifications may be made under the teachings of the present disclosure. For example, the process 700 may also include an operation regarding the processing of non real time VC tasks. The non real time VC tasks may be processed by a non real time processing subunit. However, those variations and modifications do not depart from the scope of the present disclosure.

Figure 8:
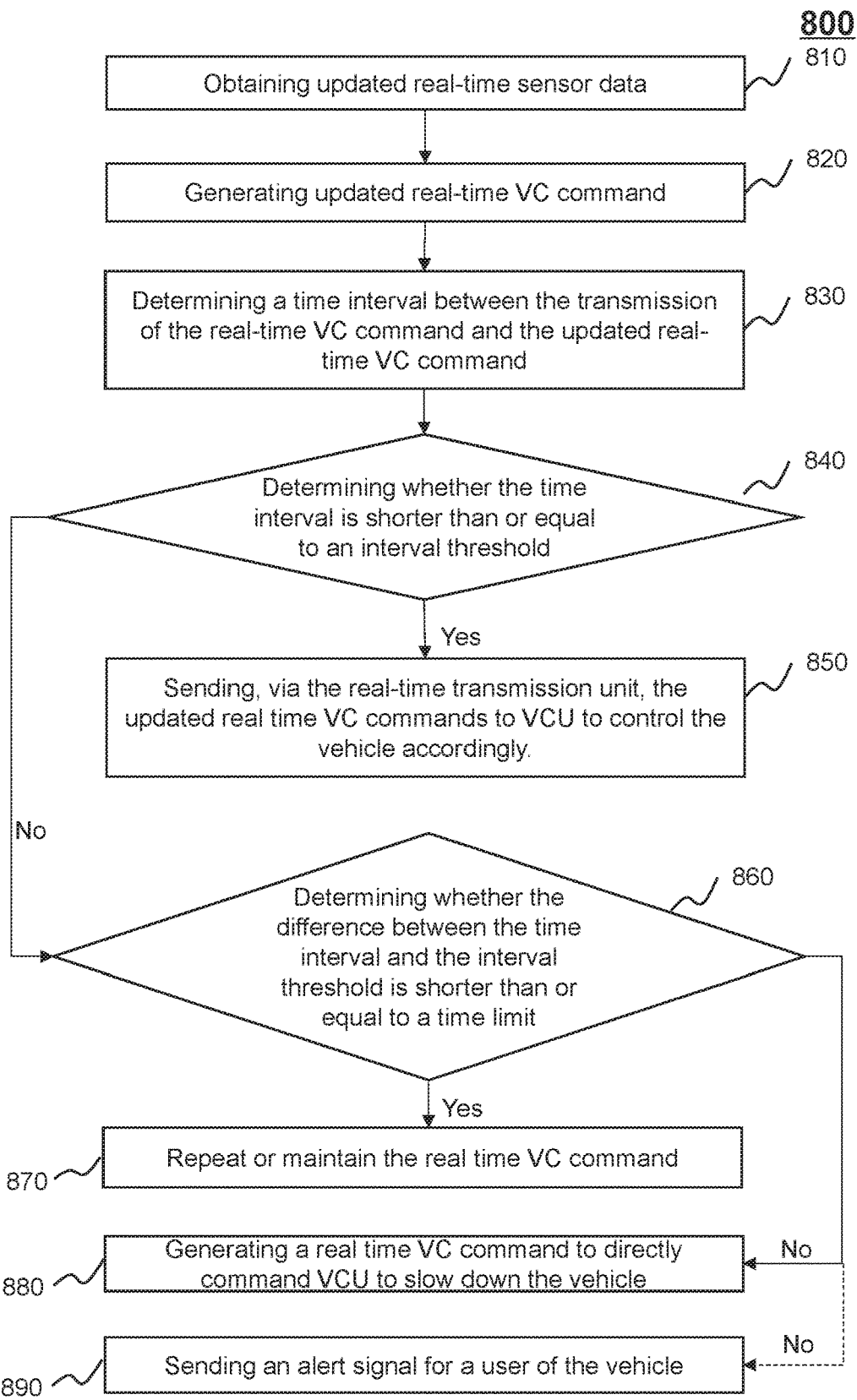
FIG. 8 is a flowchart illustrating a process for operating a vehicle automatically in real time with updated real time sensor data based on interval threshold and time limit according to some embodiments of the present disclosure.

FIG. 8 is a flowchart illustrating a process for operating a vehicle automatically in real time with updated real time sensor data based on interval threshold and time limit according to some embodiments of the present disclosure. At least one of the process and method 800 may be executed by at least one computing device in an autonomous vehicle (e.g., the ACU 240 or the computing device 300). For example, at least one of the process and method 800 may be implemented as a set of instructions (e.g., an application) stored in a non-transitory computer readable storage medium (e.g., the storage device 370). At least one processor of the computing device (e.g., the processor 320 of the computing device 300) may execute the set of instructions and may accordingly be directed to perform at least one of the process and method 800 via at least one of receiving and sending electronic signals.

In 810, the processor may obtain updated real-time sensor data. In some embodiments, during the autonomous driving, the sensor data may be updated continuously in real time. The processor may obtain the real-time sensor data for further processing, for example, generating real time VC command.

In 820, the processor may generate updated real time VC commands based on the updated sensor data accordingly. The real time VC commands may be sent to the VCU via the real-time transmission unit.

In some embodiments, there may be a time interval between the real time VC command and its immediate updated real time VC command. In 830, the processor may determine the time interval between the transmission of the real time VC command and its immediate updated real time VC command.

In 840, the processor may determine whether the time interval is shorter than or equal to an interval threshold. In some embodiments, if the time interval is shorter than or equal to an interval threshold, such as 10 ms, 20 ms, 30 ms, the updated real time VC commands may be sent to the VCU to control the vehicle accordingly through the real-time transmission unit, as illustrated in 850. For example, the VCU 440 may receive the updated real time VC command instantly via the real-time transmission unit 430, and control the vehicle in response to the updated real time VC command. In some embodiments, if the time interval is longer than the interval threshold, the processor may further determine whether the time difference between the time interval and interval threshold is shorter than or equal to a time limit, such as, 3 ms, 5 ms, 7 ms, as illustrated in 860. If the time difference is shorter than or equal to the time limit, the processor may proceed to operation 870. If the time difference is longer than the time limit, the processor may proceed to at least one of operation 880 and/or 890.

In 870, if the time difference is shorter than or equal to the time limit, the processor may, via the real-time transmission unit, repeatedly send the current real time VC command to the VCU for controlling the vehicle. The VCU may continue to perform the current real time VC command so as to maintain the current state of the vehicle.

In 880, if the time difference is longer than the time limit, the real-time transmission unit may generate a real time VC command for VCU to slow down the vehicle directly. For example, if the real-time transmission unit 430 does not receive the updated real time command within the interval threshold, the real-time transmission unit 430 may generate the real time VC command for slowing down the vehicle directly in order to reduce security risks. Upon receipt of the real time VC command for slowing down, the VCU 440 may slow down the vehicle by a braking controller.

In 890, if the time interval difference is longer than the time limit, the processor may also send an alert signal for a user of the vehicle. For example, when the real-time transmission unit 430 does not receive the real time command within the interval threshold, the processor may generate an alert signal for reminding the user of the vehicle (e.g., a driver or a passenger) to take over the vehicle. The user may drive the vehicle manually instead of the autonomous driving. In some embodiments, the alert signal may be used to remind surrounding vehicles to avoid.

In some embodiments, upon receipt of the real time VC command, the VCU may control the vehicle to perform corresponding actions automatically. The VCU may include one or more controllers of the autonomous vehicle, for example, one or more throttle controllers, one or more spark controllers, one or more brake controllers, one or more steering controllers, an exhaust gas recycling (EGR) controller, a waste gate controller, and so on. Merely by ways of example, in response to a real time command for switching lanes, the steering controller may adjust a steering angle by 0.5 degree, and the brake controller may increase a brake fluid by 1.5 bar.

It should be noted that the above description is merely provided for the purpose of illustration, and not intended to limit the scope of the present disclosure. For persons having ordinary skills in the art, multiple variations and modifications may be made under the teachings of the present disclosure. For example, operation 860 and operation 870 may be integrated to a single operation. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the example embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

We claim:

1. A system for operating a vehicle automatically in real time, the system comprising:
   at least one storage device storing at least one set of instructions;
   an arithmetic and control unit (ACU), a real-time transmission unit, and a vehicle controlling unit (VCU) in communication with the at least one storage device to execute the at least one set of instructions,
   wherein the ACU comprises a multiple core processor having at least one processing core dedicated for processing one or more real time vehicle controlling (VC) tasks and the ACU is configured to receive and process real time sensor data from a sensing system to generate one or more real time VC commands, wherein the ACU is further configured to obtain and classify one or more tasks into the one or more real time VC tasks and tasks that are not real time VC tasks (non real time VC tasks),
   wherein the real-time transmission unit is configured for transmitting the one or more real time VC commands to the VCU in real time; and
   wherein the VCU is configured for receiving and executing the one or more real time VC commands generated by the ACU to operate the vehicle in real time accordingly,
   wherein the ACU is operated by a real time operating system including at least one kernel for assigning the one or more real time VC tasks to the at least one dedicated processing core to generate the one or more real time VC commands.

2. The system of claim 1, wherein the real time sensor data includes signals from at least one of a LiDAR, a radar, a camera, or a positioning system.

3. The system of claim 1, wherein the real time operating system is a real time Linux system.

4. The system of claim 1, wherein the real-time transmission unit is configured to be operated independently from the ACU.

5. The system of claim 1, wherein the real-time transmission unit is configured to control the vehicle when the ACU is disabled or irresponsive.

6. The system of claim 1, wherein the one or more real time VC commands includes at least one of acceleration, deceleration, making a turn, or switching lanes.

7. The system of claim 1, wherein the real time sensor data is updated continuously by the system and the ACU generates updated real time VC commands based on updated real time sensor data, which is in turn transmitted to the VCU via the real-time transmission unit, and there is a time interval between the transmission of a real time VC command and its immediate updated real time VC command that is measured against an interval threshold, and the system further comprising a time limit with a set of accompany instructions stored in the storage device to instruct the system to:
   determine whether the time interval is within the interval threshold;
   if the time interval is shorter than or equal to the interval threshold, send, via the real-time transmission unit, the updated real time VC commands to VCU to control the vehicle accordingly;
   if the time interval is longer than the interval threshold, determine whether the difference between the time interval and the interval threshold is within a time limit;
   if the difference is longer than the time limit, generate, by the real-time transmission unit, a real time VC command to directly command VCU to slow down the vehicle, and
   alternatively, if the difference is shorter than or equal to the time limit, repeat or maintain the real time VC command.

8. The system of claim 7, wherein the set of accompany instructions further instructs the system to alert a user of the vehicle.

9. A method for operating a vehicle automatically in real time, comprising:
receiving and processing, via an arithmetic and control unit (ACU), real time sensor data from a sensing system;
obtaining, via the ACU, one or more tasks during the processing of the real time sensor data;
classifying, via the ACU, the one or more tasks into real time vehicle controlling (VC) tasks and non real time VC tasks; and
sending the real time VC tasks to at least one dedicated processing core of the ACU for processing the real time VC tasks and generating one or more real time VC commands accordingly,
wherein the ACU is operated by a real time operating system including at least one kernel for assigning the one or more real time VC tasks to the at least one dedicated processing core to generate the one or more real time VC commands.

10. The method of claim 9, wherein the method further comprising:
sending, via a real-time transmission unit, the one or more real time VC commands to a vehicle controlling unit (VCU) in real time for controlling the vehicle.

11. The method of claim 9, wherein the real time sensor data include signals from at least one of a LiDAR, a radar, a camera, or a global positioning system (GPS).

12. The method of claim 10, wherein the real-time transmission unit includes at least one processor that is independent from the ACU and is configured to be operated independently from the ACU to directly control the vehicle when the ACU is disabled or irresponsive.

13. The method of claim 9, wherein the real time operating system is a real time Linux system.

14. The method of claim 9, wherein the one or more real time VC commands includes at least one of acceleration, deceleration, making a turn, or switching lanes.

15. The method of claim 10, wherein the real time sensor data is updated continuously by the system and the ACU generates updated real time VC commands based on the updated real time sensor data, which is in turn transmitted to the VCU via the real-time transmission unit, and there is a time interval between the transmission of a real time VC command and its immediate updated real time VC command that is measured against an interval threshold, the method further comprising:
determining whether the time interval is within the interval threshold;
if the time interval is shorter than or equal to the interval threshold, sending, via the real-time transmission unit, the updated real time VC commands to VCU to control the vehicle accordingly;
if the time interval is longer than the interval threshold, determining whether the difference between the time interval and the interval threshold is within a time limit;
if the difference is longer than the time limit, generating, by the real-time transmission unit, a real time VC command to directly command VCU to slow down the vehicle, and
alternatively, if the difference is shorter than or equal to the time limit, repeating or maintaining the real time VC command.

16. The method of claim 9 further comprising:
sending an alert signal for a user of the vehicle.

17. A non-transitory computer readable medium, comprising at least one set of instructions, wherein when executed by at least one processor of a computing device, the at least one set of instructions causes the computing device to perform a method, the method comprising:
receiving and processing, via an arithmetic and control unit (ACU), real time sensor data from a sensing system;
obtaining, via the ACU, one or more tasks during the processing of the real time sensor data;
classifying, via the ACU, the one or more tasks into real time vehicle controlling (VC) tasks and non real time VC tasks; and
sending the real time VC tasks to at least one dedicated processing core of the ACU for processing the real time VC tasks and generating one or more real time VC commands accordingly,
wherein the ACU is operated by a real time operating system including at least one kernel for assigning the one or more real time VC tasks to the at least one dedicated processing core to generate the one or more real time VC commands.

18. The non-transitory computer readable medium of claim 17, wherein the method further comprises:
sending, via a real-time transmission unit, the one or more real time VC commands to a vehicle controlling unit (VCU) in real time for controlling the vehicle, wherein the real-time transmission unit includes at least one processor that is independent from the ACU and is configured to be operated independently from the ACU to directly control the vehicle when the ACU is disabled or irresponsive.

19. The non-transitory computer readable medium of claim 17, wherein the real time operating system is a real time Linux system.

20. The non-transitory computer readable medium of claim 17, wherein the real time sensor data is updated continuously and the ACU generates updated real time VC commands based on the updated real time sensor data, which is in turn transmitted to the VCU via the real-time transmission unit, and there is a time interval between the transmission of a real time VC command and its immediate updated real time VC command that is measured against an interval threshold, the method further comprising:
determining whether the time interval is within the interval threshold;
if the time interval is shorter than or equal to the interval threshold, sending, via the real-time transmission unit, the updated real time VC commands to VCU to control the vehicle accordingly;
if the time interval is longer than the interval threshold, determining whether the difference between the time interval and the interval threshold is within a time limit;
if the difference is longer than the time limit, generating, by the real-time transmission unit, a real time VC command to directly command VCU to slow down the vehicle, and
alternatively, if the difference is shorter than or equal to the time limit, repeating or maintaining the real time VC command.

* * * * *